United States Patent
Sakano et al.

(10) Patent No.: US 8,675,047 B2
(45) Date of Patent: Mar. 18, 2014

(54) DETECTION DEVICE OF PLANAR AREA AND STEREO CAMERA SYSTEM

(75) Inventors: Morihiko Sakano, Hitachinaka (JP); Mirai Higuchi, Mito (JP); Takeshi Shima, Mito (JP); Shoji Muramatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 197 days.

(21) Appl. No.: 13/094,239

(22) Filed: Apr. 26, 2011

(65) Prior Publication Data

US 2011/0267430 A1 Nov. 3, 2011

(30) Foreign Application Priority Data

Apr. 28, 2010 (JP) ................. 2010-102863

(51) Int. Cl.
*H04N 13/02* (2006.01)
*G01C 11/12* (2006.01)

(52) U.S. Cl.
USPC ............... 348/46; 348/47; 348/135; 348/139; 348/143; 356/2; 382/103; 382/104; 382/106; 382/154; 382/276; 382/286; 382/287; 382/289; 382/291

(58) Field of Classification Search
USPC ............ 348/42, 46, 47, 135, 139, 143, 147; 382/104, 106, 154, 103, 107, 276, 278, 382/280, 286, 287, 289, 291, 293, 294, 295, 382/296; 356/2
See application file for complete search history.

(56) References Cited

U.S. PATENT DOCUMENTS

| | | | |
|---|---|---|---|
| 6,963,661 B1 * | 11/2005 | Hattori et al. | 382/154 |
| 6,990,253 B2 * | 1/2006 | Takeda et al. | 382/276 |
| 7,313,265 B2 * | 12/2007 | Nakai et al. | 382/154 |
| 8,180,100 B2 | 5/2012 | Fujimaki et al. | |
| 2008/0075326 A1 * | 3/2008 | Otani et al. | 382/106 |

FOREIGN PATENT DOCUMENTS

| | | |
|---|---|---|
| JP | 2000-293698 A | 10/2000 |
| JP | 2005-217883 A | 8/2005 |
| JP | 2006-53757 A | 2/2006 |
| JP | 2009-163492 A | 7/2009 |

OTHER PUBLICATIONS

Japanese Office Action dated Oct. 15, 2013 (two (2) pages).

* cited by examiner

*Primary Examiner* — Christopher S Kelley
*Assistant Examiner* — Zhihan Zhou
(74) *Attorney, Agent, or Firm* — Crowell & Moring LLP

(57) ABSTRACT

A detection device of a planar area is provided. The detection device includes an image obtaining section for obtaining a left image and a right image; a planar area aligning section for setting given regions of interest to the obtained left image and the right image, and through use of a geometric transform function that matches the region of interest of the right image with the region of interest of the left image, performing geometric transform to generate a geometric transform image; and a planar area detecting section for detecting a planar area based on the geometric transform image and the region of interest of the right image. The planar area aligning section sets the planar area detected by the planar area detecting section as a given region of interest.

8 Claims, 10 Drawing Sheets

DETECTION DEVICE OF PLANAR AREA AND STEREO CAMERA SYSTEM

BACKGROUND OF THE INVENTION

1. Field of the Invention

The present invention relates to a detection device of a planar area and a stereo camera system both of which detect a planar area from an image from an imaging element for vehicle mounting.

2. Background Art

Recognition methods of traveling environments can be broadly classified into a method using a laser radar, ultrasonic waves, or a millimeter wave radar, and a method using an image.

The detection method using the laser radar or the millimeter wave radar is problematic in that, in general, devices were expensive and sufficient spatial resolution could not be obtained. The detection method using an ultrasonic sensor is problematic in that the measurement of far distance was difficult, and spatial resolving power was low.

The methods using an image can be classified into a method using an image obtained from a single eye, namely, one viewpoint, and a method using compound eyes. Conventionally, many of the methods using an image adopt the single eye, and are mainly assumed to be used under developed environments such as an expressway, and such methods detect a travelable area through detection of a white line of a road surface (e.g., a demarcation line or a halfway line) and the like. However, on a general road, in a parking space, or the like where the presence of the white line and the like was not guaranteed, and various road surface colors or patterns appeared, there was a problem that it was difficult to stably distinguish the travelable area from an obstacle based only on a density pattern.

Meanwhile, in the method involving the use of the compound eyes, namely, a detection method using stereo images, in principle, since a three-dimensional configuration of an environment can be used; it is likely that a traveling environment can be recognized more stably. In particular, since the travelable area can be seen as generally plane in the space, for example, Patent Document 1 (JP Patent Publication (Kokai) No. 2000-293698 A) and Patent Document 2 (JP Patent Publication (Kokai) No. 2005-217883 A) have already proposed a method in which projection transform is performed on images, and based on an overlapping degree of the respective images, it is detected whether or not a traveling environment is a planar area, or whether or not such traveling environment is an obstacle. In addition, the aforementioned documents have also proposed a method in which when calculating a projection transform function, an equation of the plane is obtained at the same time.

SUMMARY OF THE INVENTION

In the case of the method disclosed in Patent Document 1, the following determinations are performed: a projection transform matrix is calculated from correspondence relationships of feature points, and if a luminance value of a standard image is matched with that of a reference image on which a two-dimensional projection transform has been performed, it is determined that a traveling environment is a planar area; whereas if not matched, it is determined that such traveling environment is a non-planar area. However, the luminance value of the reference image, on which the two-dimensional projection transform has been performed, may be incidentally matched with the luminance value of the standard image also in areas other than the planar area. This causes non-detection or erroneous detection of the planar area.

Additionally, in the case of the method disclosed in Patent Document 2, it is possible to dynamically obtain the planar area so as to be able to handle vibration of a camera due to a slope of a road surface or traveling of a vehicle. However, in the same manner as in Patent Document 1, the following determinations are performed: if the luminance value of the standard image is matched with that of the reference image on which the two-dimensional projection transform has been performed, it is determined that a traveling environment is a planar area; whereas if not matched, it is determined that such traveling environment is a non-planar area. There is no disclosure regarding an effective method suppressing the non-detection or the erroneous detection of the planar area. Moreover, a two-dimensional projection transform function is calculated regarding a preliminarily set local area. Thus, in the case where a whole of a traveling area is not a complete plane, a pixel leading to a large error in projection transform may appear. This also causes the non-detection or the erroneous detection of the planar area.

An object of the present invention is to provide a detection device of a planar area and a stereo camera system both of which suppress matching between luminance values in areas other than a planar area, and non-detection and erroneous detection of the planar area arising from an error in projection transform.

In order to solve the above-mentioned problems, the present invention is constructed to include a planar area aligning section configured to set given areas to a plurality of obtained images, and through use of a geometric transform function that matches the area of one image of the plurality of images with the area of the other image of the plurality of images, generate a geometric transform image; and a planar area detecting section configured to detect a planar area based on the geometric transform image and the area of the other image, wherein the planar area aligning section sets a planar area detected by the planar area detecting section as the given area.

In addition, the present invention is constructed to include a stereo camera configured to take a left image and a right image; an image obtaining section configured to obtain a left image and a right image from the stereo camera; a planar area aligning section configured to set given areas to the obtained left image and right image, and through use of a geometric transform function that matches the area of one of the left image and the right image with the area of the other, perform geometric transform to generate a geometric transform image; and a planar area detecting section configured to detect a planar area based on the geometric transform image and the one or the other area where the geometric transform is not performed, wherein the planar area aligning section sets a planar area detected by the planar area detecting section as the given area.

According to the present invention, it is possible to provide a detection device of a planar area and a stereo camera system both of which suppress matching of luminance values in areas other than a planar area, and non-detection and erroneous detection of the planar area arising from an error in projection transform.

DETAILED DESCRIPTION OF THE PREFERRED EMBODIMENT

Figure 1:
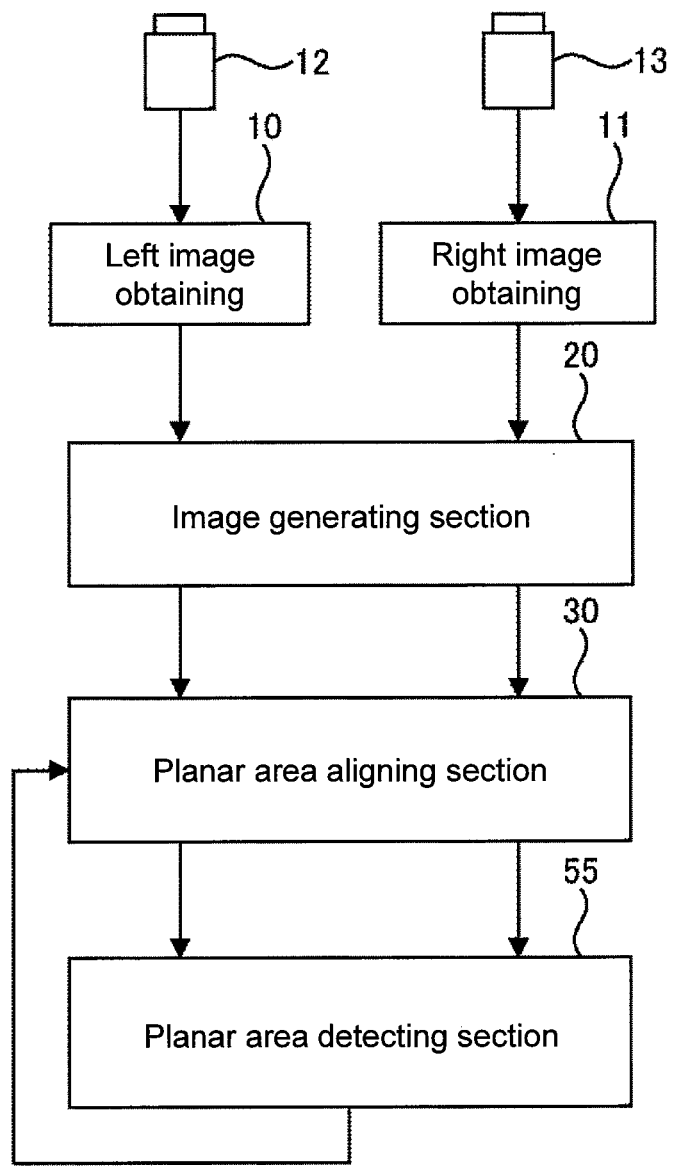
FIG. 1 is a view showing one configuration example of a detection device of a planar area according to the present invention.

FIG. 1 shows one configuration example of a detection device of a planar area according to the present invention.

The present invention has a feature in detecting a planar area in an imaged image while suppressing non-detection and erroneous detection of the planar area.

Figure 2:
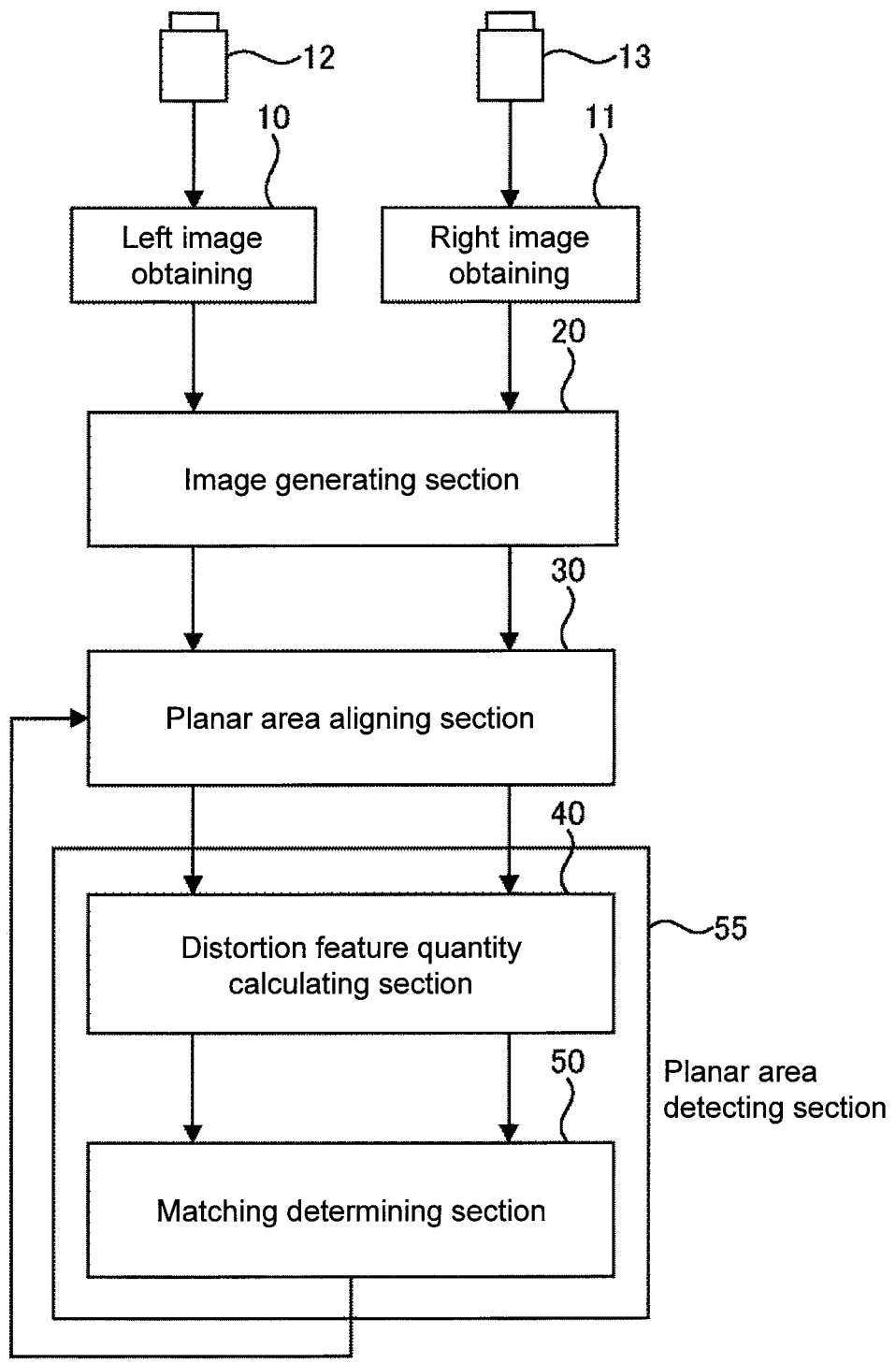
FIG. 2 is a view showing a configuration example of a planar area detecting section of the present invention.

The detection device of a planar area of the present invention is taken as a stereo camera device in the present embodiment. The stereo camera device comprises image obtaining sections (a left image obtaining section 10 and a right image obtaining section 11) that obtain a plurality of images (a left image and a right image) imaged by two imaging sections (a left camera 12 and a right camera 13), an image generating section 20, a planar area aligning section 30, and a planar area detecting section 55. As shown in FIG. 2, the planar area detecting section 55 comprises a distortion feature quantity calculating section 40 and a matching determining section 50. It is to be noted that a configuration including the two imaging sections (the left camera 12 and the right camera 13), which is a stereo camera, and the detection device of a planar area is taken as a stereo camera system.

From the left camera 12 and the right camera 13, the synchronized images are taken in by the left image obtaining section 10 and the right image obtaining section 11, respectively.

The image generating section 20 corrects various distortion, and generates images having no distortion as correction images. Normally, in a camera, a unique distortion is present due to the misalignment in installing an imaging device, distortion unique to an attached lens, the misalignment in an optical-axis direction of the camera, or the like. In the image generating section 20, this distortion is removed.

The planar area aligning section 30 performs the geometric transform on one image of the two images that are the correction images generated in the image generating section 20, and matches pixel positions of the planar area of such image with those of another image. At this time, as pixels on which matching is performed, only the pixels included in the planar area are selected, and are set as a region of interest that is a given area. For example, in the case of being used as a sensor that is mounted in a vehicle and recognizes a travelable area, a rectangular area at a lower part of the image is set as the region of interest.

As shown in FIG. 2, the planar area detecting section 55 detects the planar area in the imaged image with a configuration as, for example, the distortion feature quantity calculating section 40 and the matching determining section 50.

In the planar area aligning section 30, the image having the following feature is obtained: when the geometric transform, in which the pixel positions of the planar area are matched, is performed, only the planar area is matched with that of the other image; in other areas, the distortion occurs in the image, resulting in non-matching with those of the other image. In order to discriminate the matching from the non-matching between both of the images, the distortion feature quantity calculating section 40 calculates a feature quantity that expresses the distortion of the image.

The matching determining section 50 discriminates the matching from the non-matching between the two images through use of the feature quantity that expresses the distortion of the image obtained by the distortion feature quantity calculating section 40, and detects the planar area while suppressing the non-detection and the erroneous detection.

A whole of the detected planar area is input as the region of interest in the planar area aligning section 30, and the geometric transform, in which the pixel positions of the whole of the planar area are matched, is obtained. A geometric transform function includes parameters that represent geometric relationships between the cameras and an equation that approximates the plane. Thus, if the geometric relationships of the cameras are the same, the obtaining of the geometric transform function that matches the pixel positions of a whole of the plane is equal to the obtaining of the equation of the plane that approximates the whole of the plane. The equation of the plane is extracted from the geometric transform function that matches the pixels positions of the whole of the plane, thereby calculating a plane equation that approximates the whole of the planar area.

In the above-mentioned Patent Document 2, luminance values are used for discriminating the matching from the non-matching between two images of a geometric transform image and a standard image. However, basically, a natural image is made up of low-frequency components, that is, the luminance values of surroundings are resembled. Thus, even in the case where there is the occurrence of the distortion on the image due to the geometric transform image, when a luminance difference is taken between the two images of the geometric transform image and the standard image, the values may be small. In the aforementioned well-known example, an area having the small luminance difference is considered as the planar area. Thus, although there is the occurrence of the distortion on the image, ambient luminance is resembled, whereby the luminance difference between the two images incidentally becomes small, and the areas may be erroneously detected.

In addition, in Patent Document 2, the plane equation is extracted from the geometric transform function. If the geometric relationships between the imaging sections are well known, the geometric transform function, which matches the planar areas, becomes a function in which only coefficients of the plane equation are taken as the parameters. Thus, the plane equation can be obtained by calculating the geometric transform function. At this time, it is required to set the planar area, which is initially selected as the region of interest, so as not to include areas other than the plane. However, the geometric transform function and the plane equation, both of which match only the pixels in the selected areas, are obtained. Thus, it may be largely different from the plane equation that approximates the whole of the planar area. In the latter processing, when detecting an obstacle in the distance and the like, estimation accuracy of the plane has an influence. Thus, the occurrence of such estimation error leads to a problem.

Figure 3:
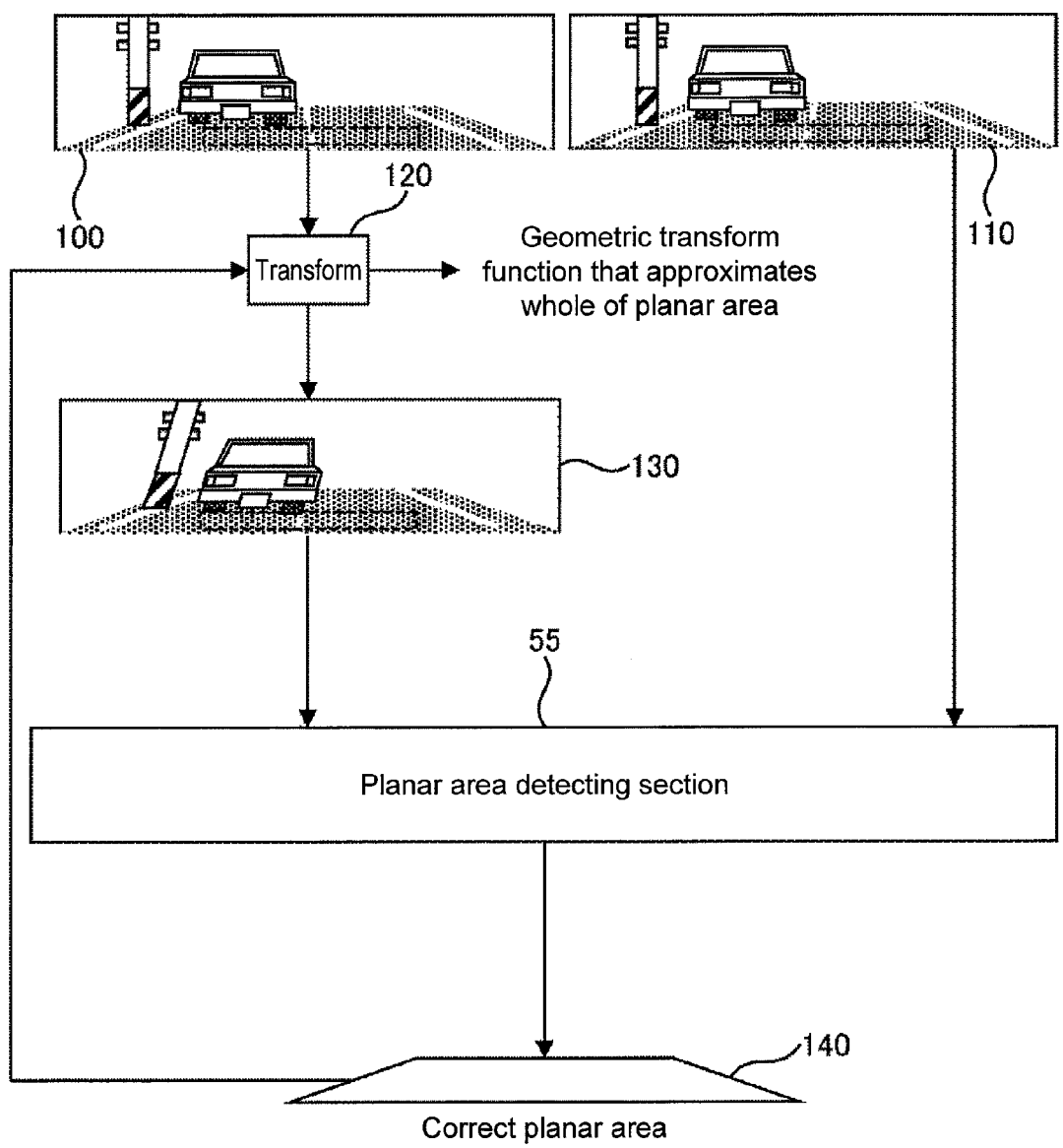
FIG. 3 is a view showing a main configuration of the detection device of a planar area according to the present invention.

FIG. 3 shows a main idea of the present detection device of a planar area.

With respect to each of a left image 100 and a right image 110 taken in by the left image obtaining section 10 and the right image obtaining section 11, a location able to be seen as the plane is set as the initial region of interest that is a given area in the planar area aligning section 30. Next, in a transforming section 120 of the planar area aligning section 30, there is obtained the geometric transform function that matches the region of interest of the left image 100 with the region of interest of the right image 110. Here, the obtained geometric transform function is applied to one of the images to perform the geometric transform thereon, and a geometric transform image 130, in which the images of the regions of interest are matched, is obtained. At this time, the geometric transform is established only regarding the planar area, and in the areas other than the planar area, the distortion occurs.

The planar area detecting section 55 compares the geometric transform image 130 with the right image 110, and detects the planar area. It is determined that the area, in which the images are matched, is the planar area; whereas the areas, in which the images are not matched, are not the planar areas. The planar area detected here is newly set as a region of interest, and the geometric transform function is calculated again. Since the initial region of interest is set so as not to include the areas other than the plane, the geometric transform function, which approximates only the plane serving as the region of interest, is obtained. The obtained geometric transform function is not a geometric transform function that approximates the whole of the plane with high accuracy.

However, taking a planar area 140 as the region of interest, the geometric transform function is calculated again, thereby enabling it to make the planar area, which is wider than the initial region of interest, the region of interest. Thus, it is possible to obtain the geometric transform function that approximates the whole of the plane with higher accuracy.

In order to suppress the non-detection and the erroneous detection arising from the matching of the luminance values in the areas other than the planar area, there is adopted a distortion feature quantity that expresses the distortion of the image as feature quantity to be differentiated. In order to suppress the non-detection and the erroneous detection arising from an error in projection transform, the planar area in a previous frame or the planar area preliminarily calculated from the aforementioned image is set as the region of interest when calculating a projection transform function.

Figure 4:
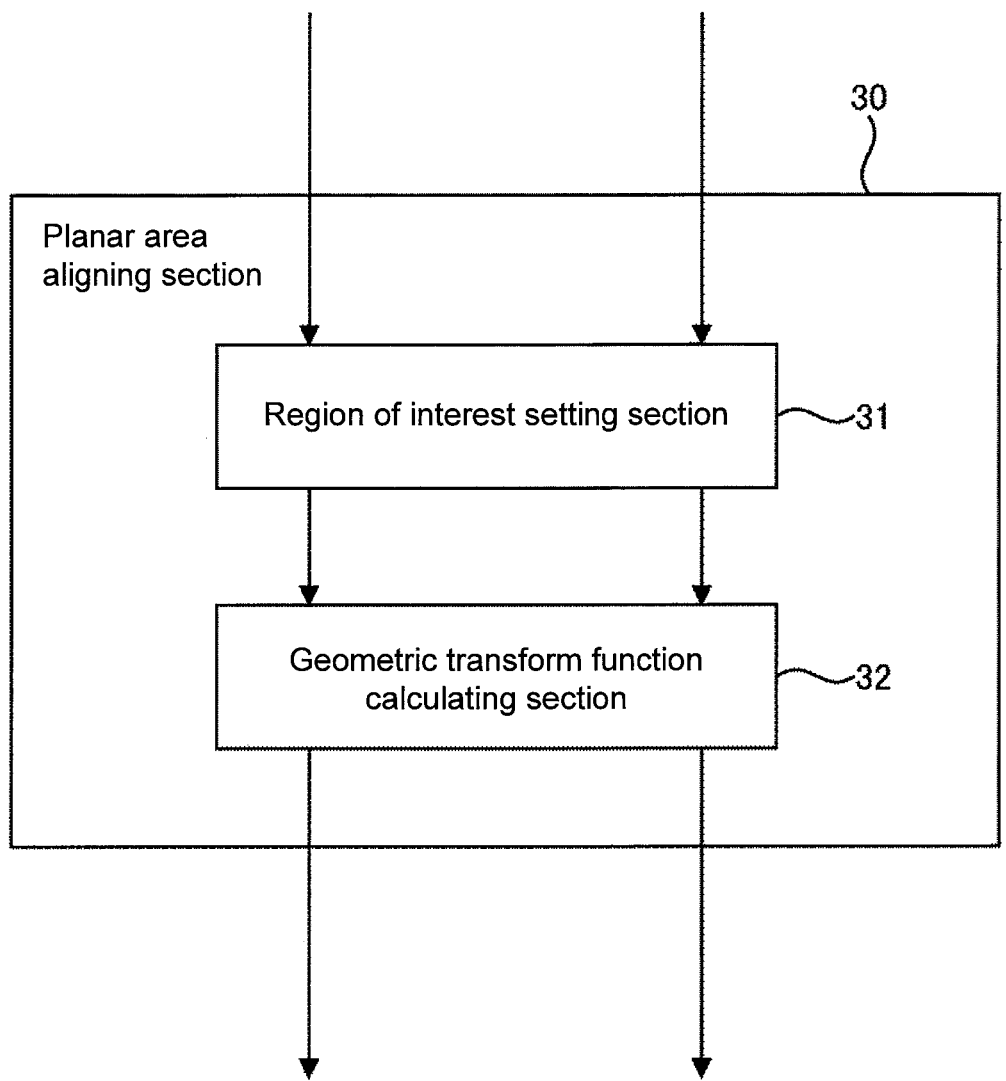
FIG. 4 is a view showing a configuration example of a planar area aligning section of the present invention.

FIG. 4 shows one example of a processing flow of the planar area aligning section 30. The planar area aligning section 30 comprises a region of interest setting section 31 and a geometric transform function calculating section 32.

The region of interest setting section 31 sets a group of pixels included in the planar area as the region of interest. For example, in the case of being used as the sensor that is mounted in the vehicle and recognizes the travelable area, the fixed rectangular area is taken at the lower part of the image where it is highly likely that the image of the plane, on which the vehicle is currently traveling, is imaged, and is set as the region of interest.

The equation of the plane, which approximates only the set area, may be obtained, and with respect to the whole of the travelable plane, approximate accuracy may be lowered. Accordingly, in the processing in the latter part, the pixels of the whole of the planar area are calculated. Thereafter, taking such area as the region of interest, the equation of the plane, which approximates the whole of the travelable plane, is calculated. This makes it possible to determine the obstacle in the distance and the like with high accuracy.

The geometric transform function calculating section 32 designs an error function in such a manner that the images in the planar area are matched, and obtains the geometric transform function that minimizes the error. An error function E is designed as in, for example, Equation (1).

[Equation 1]

$$E = \sum_{x \in R} (I(W(x; p)) - T(x))^2 \qquad \text{Equation (1)}$$

Here, the symbol "I" denotes an image targeted for transform; the symbol "T" denotes the standard image; the symbol "W" denotes a geometric transform matrix; the symbol "R" denotes the aggregation of the pixels in the region of interest; the symbol "X" denotes a vector that expresses the pixel position; and the symbol "p" denotes the parameter of the geometric transform function. In order to solve this nonlinear optimization problem, the parameter of the geometric transform function is minimally changed in such a manner that the errors decrease, and through the repetition of this minimal change, the geometric transform function, which minimizes the error function, is obtained. That is, as in Equation (2), an amount of the minimal change, which minimizes the error function E, is solved, and the parameter of the geometric transform function is updated.

[Equation 2]

$$E = \sum_{x \in R} (I(W(x; p + \Delta p)) - T(x))^2 \qquad \text{Equation (2)}$$

Here, the symbol "$\Delta p$" denotes the amount of the minimal change in the parameter of the geometric transform function, and is obtained by Equation (3) described below.

[Equation 3]

$$\Delta p = H^{-1} \sum_{x \in R} \left[ \nabla I \frac{\partial W}{\partial p} \right]^t (T(x) - I(W(x; p))) \qquad \text{Equation (3)}$$

Here, the symbol "$\nabla I$" denotes a vector having, as elements, a horizontal differential value and a vertical differential value of the image targeted for transform. The symbol "H" denotes a Hessian matrix, and is expressed by Equation (4) described below.

[Equation 4]

$$H = \sum_{x \in R} \left[ \nabla I \frac{\partial W}{\partial p} \right]^t \left[ \nabla I \frac{\partial W}{\partial p} \right] \qquad \text{Equation (4)}$$

The parameter of the geometric transform function is updated by Equation (5) described below.

[Equation 5]

$$p \leftarrow p + \Delta p \qquad \text{Equation (5)}$$

Here, given that the geometric transform function is, for example, as the following Equation (6), taking the geometric relationships between the imaging sections as those that are well known, the equation of the plane can be introduced.

[Equation 6]

$$W = R + t^t p \qquad \text{Equation (6)}$$

Here, the symbol "R" denotes rotation between the imaging sections, and the symbol "t" denotes parallel movement between the imaging sections. At this time, the symbol "p" denotes a normal line vector of the plane.

The error function E may obtain not only the geometric transform that matches the luminance values of the images as in Equation (1), but the geometric transform that matches the feature quantity extracted from the images as in the following Equation (7).

[Equation 7]

$$E = \sum_{x \in R} (I_f(W(x; p)) - T_f(x))^2 \qquad \text{Equation (7)}$$

Here, the symbols "$I_f$" and "$T_f$" denote the feature quantity extracted from the symbols "I" and "T," respectively, and represent, for example, edge strength, a gradient direction, or the like.

The geometric transform function calculating section 32 repeatedly minimizes the error function E of Equation (1), thereby obtaining the geometric transform function. In order to actualize the speeding up, it is effective to reduce a calculation amount per one repetition and the number of repetitions required until convergence. The present embodiment presents a method reducing the number of repetitions required until convergence.

Figure 5A:
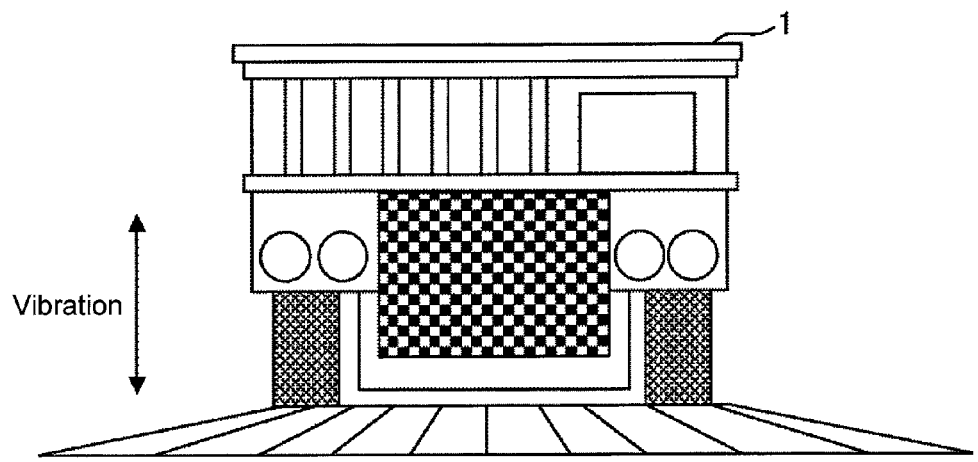
FIGS. 5A and 5B are views showing a point at issue in the case of being operated under an environment where vibration is large.
Figure 5B:
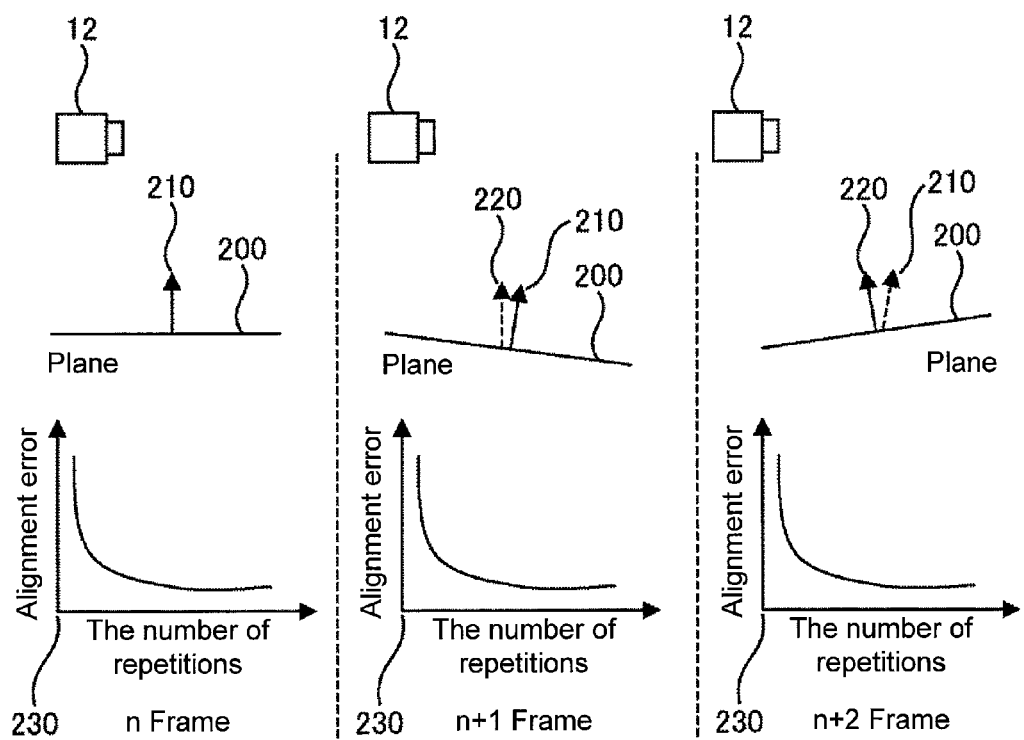

FIGS. 5A and 5B show a state where calculation time increases due to vehicle vibration, in which an explanation will be made as to a point at issue in the case of being operated under an environment where vibration is large.

As shown in FIG. 5A, in the case where a vehicle 1 and the like, which mounts an imaging system including the imaging sections (the left camera 12 and the right camera 13), largely vibrates, the plane largely fluctuates relatively to the imaging sections due to the vibration of the imaging sections. At this time, as shown in FIG. 5B, in the imaging system, the plane equation to be calculated largely fluctuates between the frames. As proceeding in the order of a frame n, a frame n+1, and a frame n+2, a relative relationship between the left camera 12 and a plane 200 largely fluctuates with the rise of the vehicle vibration. If the vibration of the imaging sections is small and the fluctuations between the frames are small, the plane equation (normal line) 210 obtained in the previous frame is used as an initial plane equation (normal line) 220 of the next frame, thereby enabling it to reduce the number of repetitions.

In this case, however, even if repeated calculation is performed taking the plane equation obtained in the previous frame as an initial value, a difference between a solution, which should converge, and the initial value is large. Thus, as shown in a graph 230, it takes time for the reduction in errors to converge.

Figure 6:
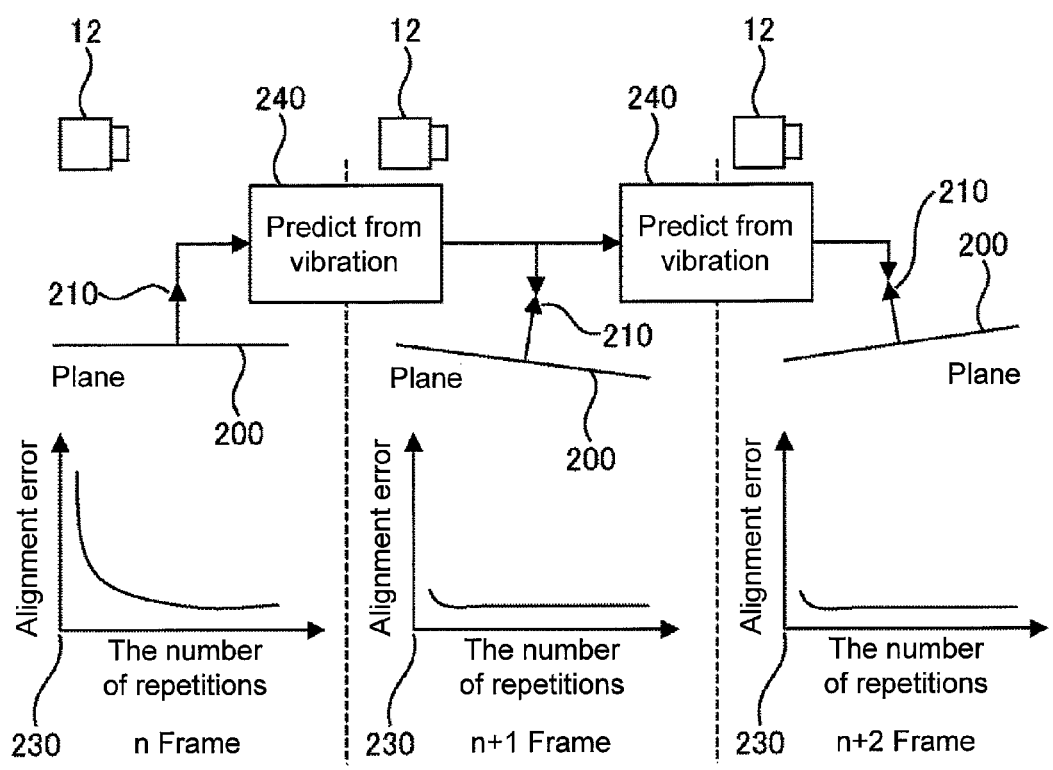
FIG. 6 is a view showing a content of speed up process.

FIG. 6 shows one example for actualizing the speeding up. For example, a sensor 240, which measures a posture of the vehicle 1 such as a gyro, measures motions of the vehicle occurred between the frames, and motion information of the vehicle is added up to an estimation result of the plane equation estimated in the previous frame, thereby estimating a plane equation 210 of the current frame.

In the case of FIG. 1, it is only necessary to put this posture information in the planar area aligning section 30. Taking the estimated plane equation as the initial value of the plane equation of the next frame, minimization processing of the error is executed, thereby enabling it to significantly reduce the number of repetition processing as shown in the graph 230, and actualize the speeding up. Before executing the repetition processing, errors in Equation (1) or Equation (7) may be evaluated, and if the errors are sufficiently small, an output value may be used without any change to calculate the geometric transform function. In addition, since it is only necessary for the plane equation used as the initial value to come close to that of the current frame, it is possible to use the gyro even in the case where the accuracy of the gyro is low.

The image transformed by the geometric transform function and the standard image show a property in which in the planar area, the images are matched; in other areas, the images are not matched due to the distortion caused by the geometric transform image.

In order to discriminate the planar area from the non-planar area by utilizing the presence or non-presence of the distortion, the distortion feature quantity calculating section 40 obtains the feature quantity for detecting the distortion occurred in the geometric transform image.

Figure 7:
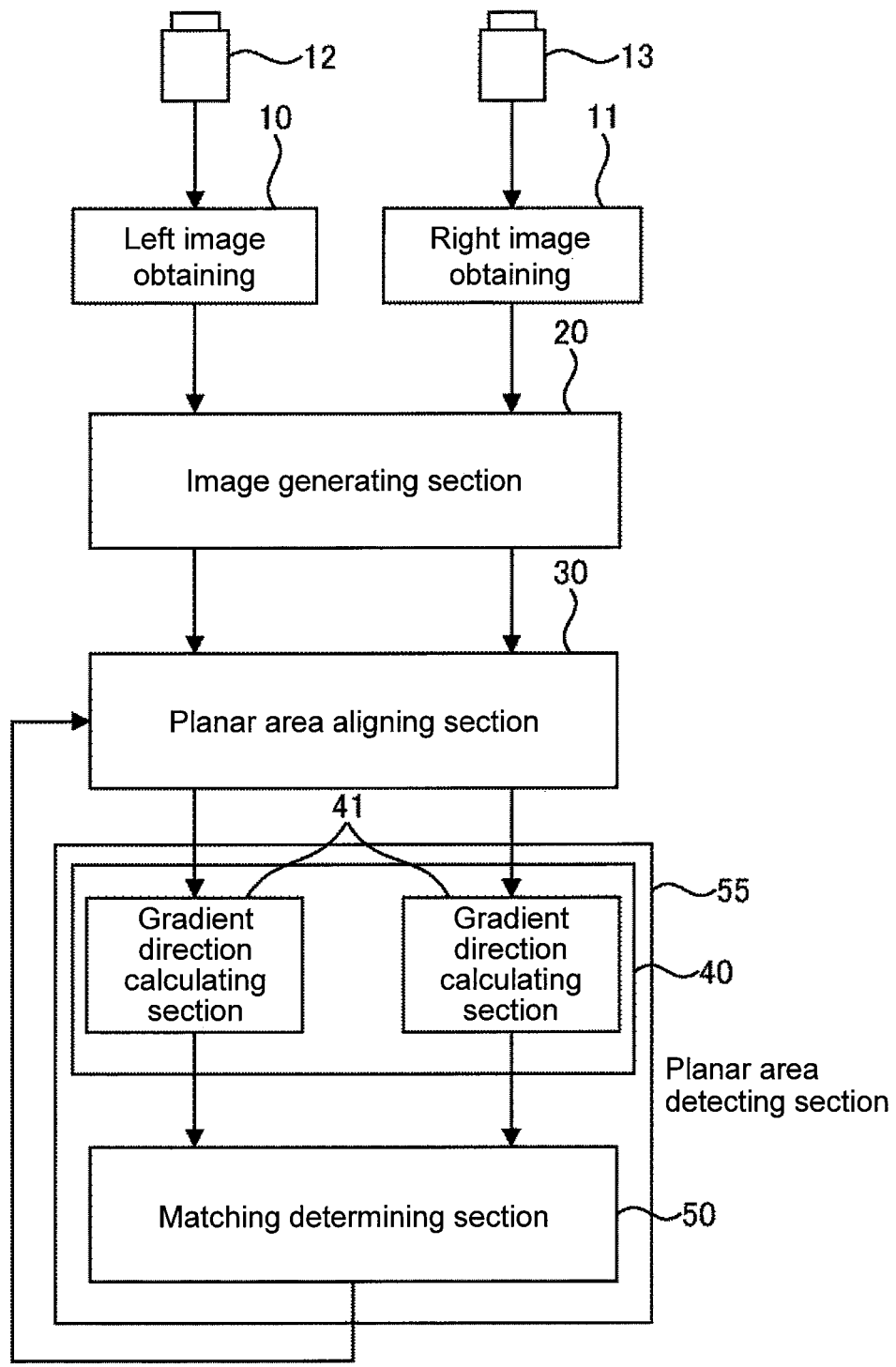
FIG. 7 is a view showing a distortion feature quantity calculating section of the present invention.

FIG. 7 shows a processing flow in the case of using the gradient direction in the distortion feature quantity detecting section 40.

In the distortion feature quantity detecting section 40 in the present embodiment, a gradient direction calculating sections 41 obtains the gradient direction as the feature quantity with respect to each of the geometric transform image, which has been obtained in the planar area aligning section 30, and the standard image, and the feature quantity obtained from both of the images of the left image and the right image is input in the matching determining section 50. The matching determining section 50 compares the feature quantity, and determines the matching and the non-matching of the both images, thereby detecting the planar area in the image.

Figure 8A:
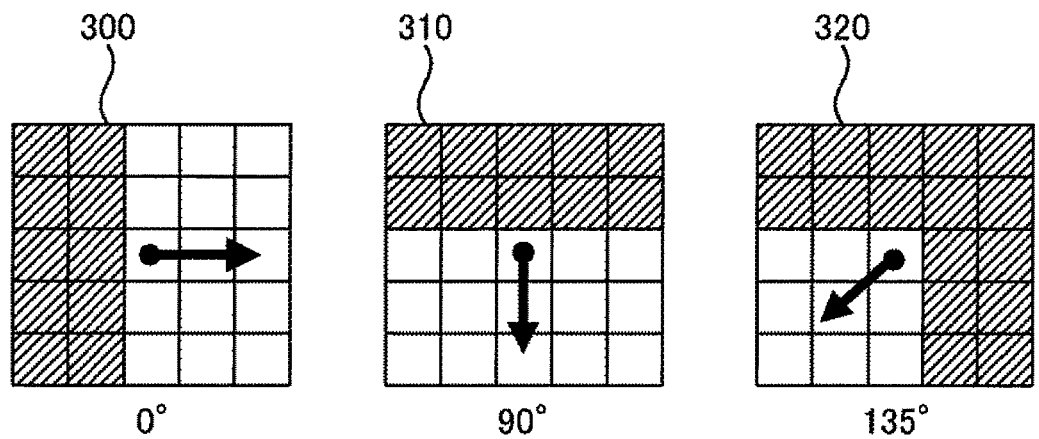
FIGS. 8A and 8B are views showing a feature of a gradient direction.
Figure 8B:
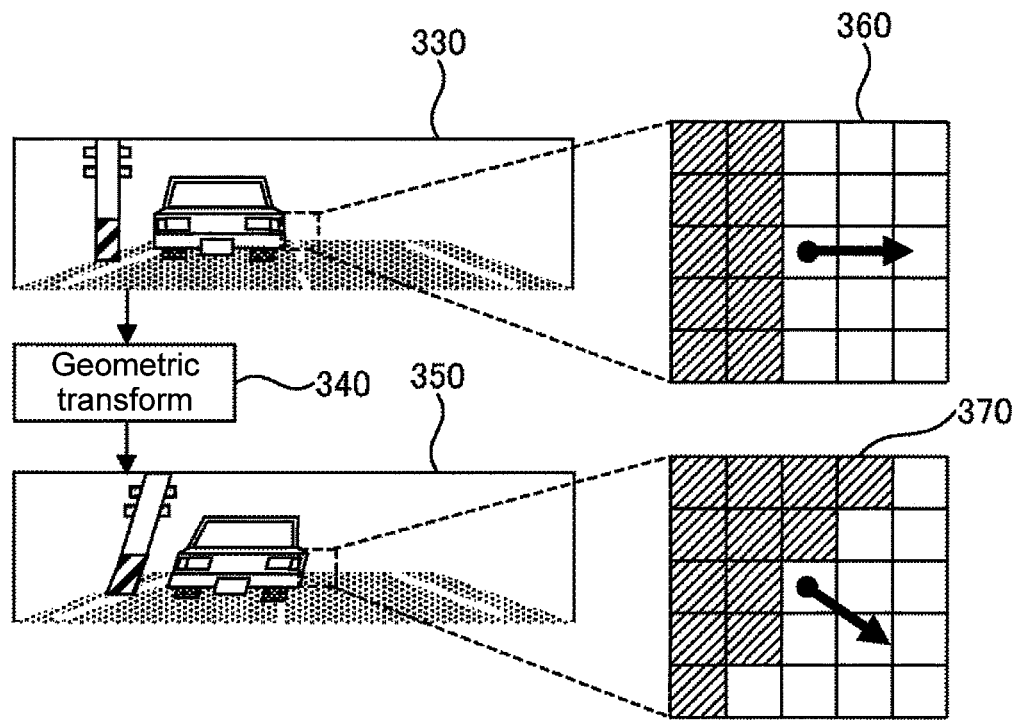

FIGS. 8A and 8B show the feature of the gradient direction. As shown in FIG. 8A, the gradient direction expresses an increasing direction of the luminance in a local area. The gradient direction is determined by a ratio of an amount of increase in the luminance in a horizontal direction and an amount of increase in the luminance in a vertical direction. That is, the gradient direction is defined by the following Equation 8.

[Equation 8]

$$\theta(i, j) = \tan^{-1}\left(\frac{\sum_{k=-w}^{w} I(i+w, j+k) - \sum_{k=-w}^{w} I(i-w, j+k)}{\sum_{k=-w}^{w} I(i+k, j+w) - \sum_{k=-w}^{w} I(i+k, j-w)}\right) \qquad \text{Equation (8)}$$

Here, the symbol "θ" denotes the gradient direction; the symbol "w" denotes the width of the local area; the symbols "(i, j)" denote the pixel position; and the symbol "k" denotes a count of an increment. The symbol "$\tan^{-1}$" denotes a four-quadrant arctangent. The gradient direction expresses the increasing direction as seen, for example, in the case where the luminance in the local area is distributed as in a local area 300, the gradient direction is 0 degree; in the case where the luminance in the local area is distributed as in a local area 310, the gradient direction is 90 degrees; and in the case where the luminance in the local area is distributed as in a local area 320, the gradient direction is 135 degrees.

FIG. 8B shows a state where the gradient direction changes due to the distortion caused by the geometric transform. For example, in the case where the image is distorted by the transforming section 340 as seen in the transform from a left image 330 to a geometric transform image 350, a luminance distribution in the identical local area changes as seen in the change from a local area 360 to a local area 370. With this change, the gradient direction also changes.

In contrast, in the case where the luminance in the local areas is matched, the gradient directions are also identical. Accordingly, it is possible to discriminate the area where the images are matched from the area where the images are not matched due to the distortion.

Additionally, an absolute difference of the luminance is ignored, and reference is made only to the relative increasing direction. Thus, also in a textureless area and the like, in the same manner as in other areas, it is possible to calculate the feature quantity, and is possible to discriminate the matching of the images from the non-matching thereof.

Figure 9:
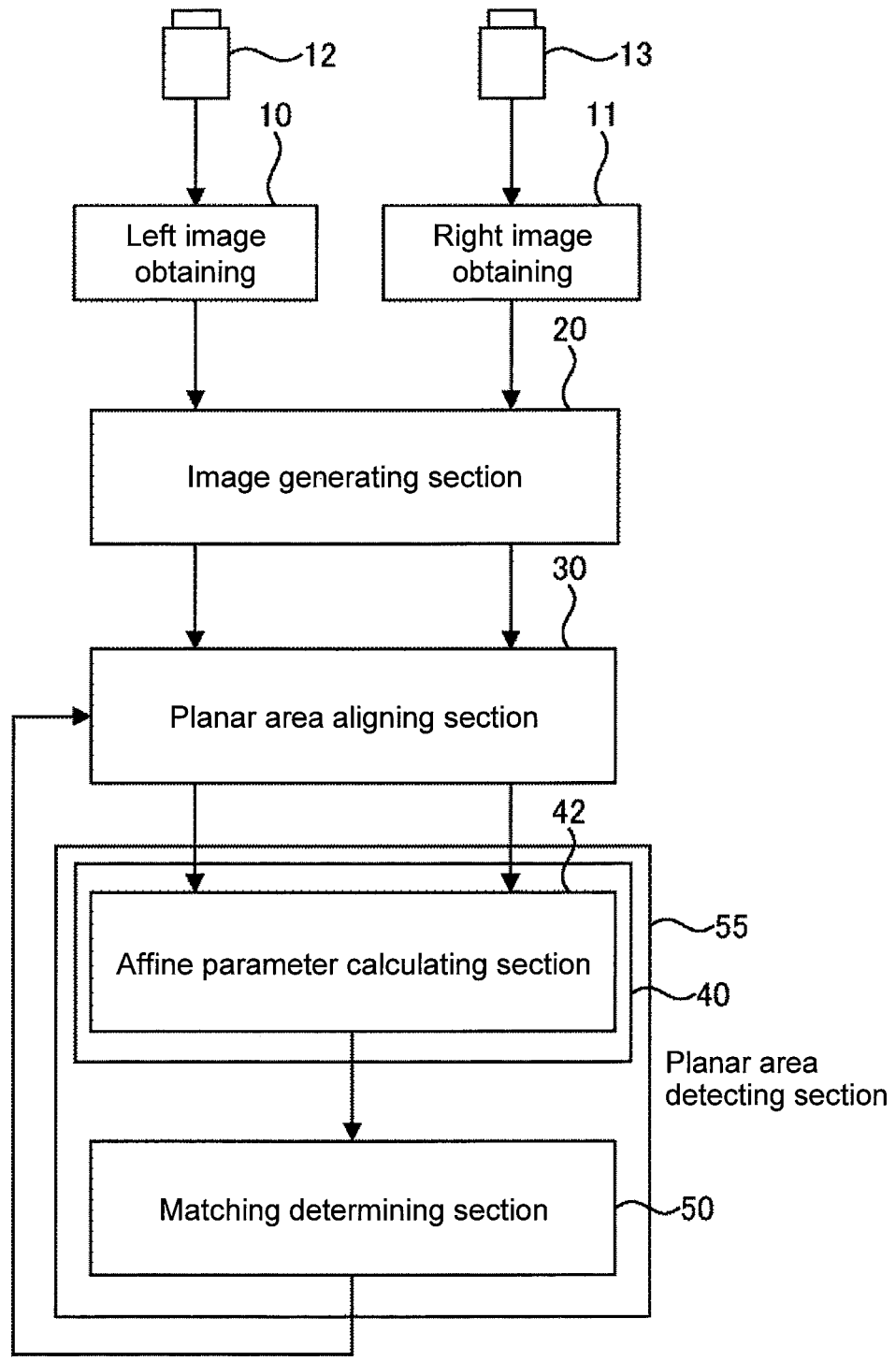
FIG. 9 is a view showing another configuration example of the detection device of a planar area according to the present invention.

FIG. 9 shows a processing flow in the case of using modified parameters of affine transform in the distortion feature quantity detecting section 40.

In the distortion feature quantity detecting section 40 in the present embodiment, an affine parameter calculating section 42 obtains, as the feature quantity, the modified parameters of the affine transform from both of the geometric transform image, which has been obtained in the planar area aligning section 30, and the standard image, and the obtained feature quantity is input in the matching determining section 50.

The matching determining section 50 compares the feature quantity obtained in the distortion feature quantity detecting section 40 with the modified parameters of the affine transform in the case of no distortion, and determines the presence or non-presence of the distortion based on a comparison result, thereby detecting the planar area in the image.

Figure 10A:
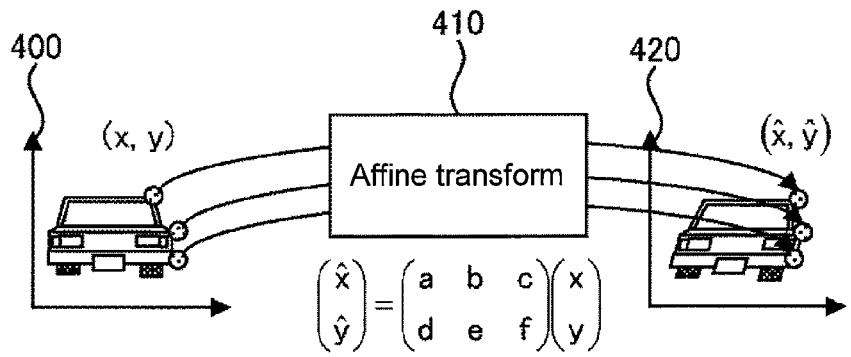
FIGS. 10A and 10B are views showing a feature of affine parameters of FIG. 9.
Figure 10B:
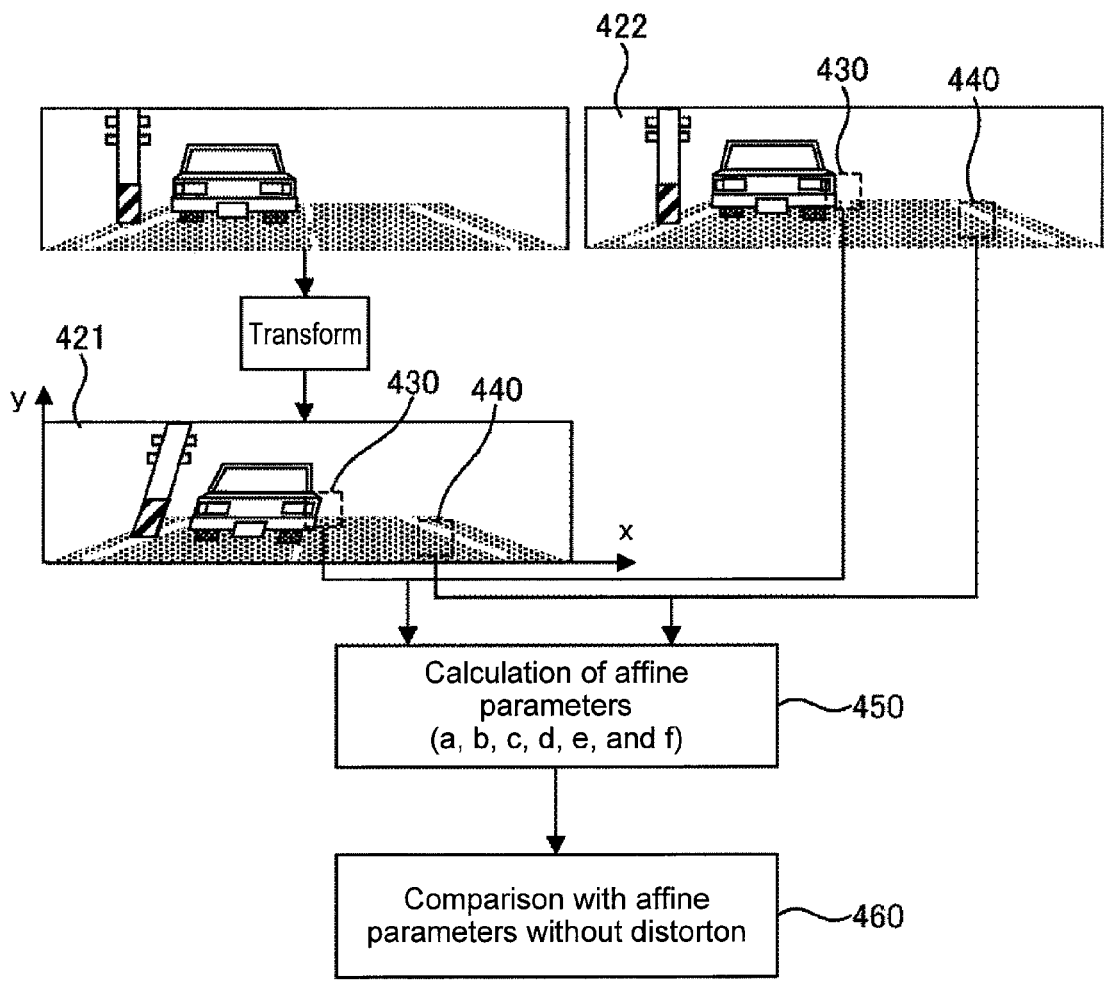

FIGS. 10A and 10B show the modified parameters of the affine transform. Coordinates x, y in a graph 400 are transformed by two-dimensional affine transform 410 expressed by the following Equation (9), and transformed coordinates shown by a graph 420 are obtained.

[Equation 9]

$$\begin{pmatrix} \hat{x} \\ \hat{y} \end{pmatrix} = \begin{pmatrix} a & b & c \\ d & e & f \end{pmatrix} \begin{pmatrix} x \\ y \end{pmatrix} \quad \text{Equation (9)}$$

Here, the symbols
$\hat{x}, \hat{y}$
denote the coordinates after the transform, and the symbols "a, b, c, d, e, and f" denote the modified parameters. These six modified parameters uniquely determine the transform.

FIG. 10B shows the summary of plane detection utilizing the modified parameters of the affine transform. In the case where there is no distortion in the image, the modified parameters are as in the following Equation (10).

[Equation 10]

$$\begin{pmatrix} \hat{x} \\ \hat{y} \end{pmatrix} = \begin{pmatrix} 1 & 0 & 0 \\ 0 & 1 & 0 \end{pmatrix} \begin{pmatrix} x \\ y \end{pmatrix} \quad \text{Equation (10)}$$

Owing to the property of the affine transform, the larger the distortion is, the larger a difference from the modified parameters of Equation (10) is. Accordingly, the distortion feature quantity detecting section 40 in the present embodiment, in a geometric transform image 421 and a right image 422 that is the standard image, performs comparison between areas 430 and 440 etc., which are targets for comparison when detecting the plane; in a modified parameter calculating section 450 of the affine transform, obtains modified parameters; and in a modified parameters comparing section 460, compares such modified parameters with modified parameters in the case of no distortion, thereby obtaining the feature quantity for detecting the planar area. The calculation of the modified parameters of the affine transform is obtained by, for example, minimizing the error function E expressed by the following Equation (11).

[Equation 11]

$$E = \sum_{x \in R} (\tilde{I}(W(x; p)) - T(x))^2 \quad \text{Equation (11)}$$

Here, the symbol
$\tilde{I}$
denotes the image after the geometric transform. In addition, the symbol "R" denotes the local area to which attention is drawn. The symbol "W" expresses the affine transform as in the following Equation (12).

[Equation 12]

$$W = \begin{pmatrix} a & b & c \\ d & e & f \end{pmatrix} \quad \text{Equation (12)}$$

The affine transform parameters in the local area are compared with the affine transform parameters in the case of no distortion by, for example, evaluating a Euclidean distance while regarding the respective parameters as a vector. That is, the evaluation is performed through use of a Euclidean distance S expressed by the following Equation (13).

[Equation 13]

$$S = \|w - w_{nd}\| \quad \text{Equation (13)}$$

Here, the symbol "w" denotes that elements of the modified parameters of the affine transform, which have been obtained between the image after the geometric transform and the standard image, are lined up as the vectors. In addition, the symbol "$w_{nd}$" denotes that the elements of the affine transform parameters in the case of no distortion are lined up as the vectors. The affine transform parameters in the local area may be compared with the affine transform parameters in the case of no distortion through use of other evaluation values such as an urban-area distance, a Mahalanobis distance, or a weighted Euclidean distance, not limited to the Euclidean distance S.

The matching determining section 50 discriminates the matching from the non-matching between the two images through use of the feature quantity that expresses the distortion of the image obtained in the distortion feature quantity calculating section 40, and detects the planar area while suppressing the non-detection and the erroneous detection.

When the distortion feature quantity calculating section 40 uses the gradient direction, the matching determining section obtains a difference value in the gradient direction, which is an output value of Equation (8) etc. In the area where the luminance distributions are matched, the gradient directions are also matched. Thus, the difference value becomes small, and takes a value close to 0. In contrast, in the area where there is the occurrence of the distortion in the image due to the geometric transform, the gradient direction is changed. Thus, the difference value does not become 0, but becomes a comparatively larger value. Accordingly, it is possible to separate the planar area from other areas by applying threshold processing and the like to the difference value.

Regarding the feature quantity, since the evaluation thereof is performed in comprehensive consideration of the local distribution, an area smoothing filter such as a mean filter or a median filter may be applied. Additionally, a result of repeated application of these filters may be used as a value to be differentiated. It is effective for the case where part of the evaluation value cannot be adequately calculated due to a noise and the like, and takes a locally erroneous value. Moreover, after applying the threshold processing, through use of a morphological operation, the planar area may be reshaped, or a minimal area may be removed. Using a square measure of a connected area, the area may be reshaped.

Even in the case where the image is distorted, the gradient direction may be small depending on the distribution of the luminance values. For example, in the case where a strong edge is distributed in the horizontal direction, and there is also the occurrence of the distortion of the image only in the horizontal direction, it is likely the luminance values are distributed so as to be orthogonal to the edge in the horizontal direction in the same manner both in the geometric transform image and in the standard image.

Accordingly, other feature quantities are supplementarily used to determine whether or not the pixels, which cannot be determined using only the distortion feature quantity, belong to the plane. For example, three-dimensional coordinate information obtained from the stereo camera is used as the feature quantity. The stereo camera performs distance calculation based on the principle of triangulation, and applies the resultant to a perspective projection model, thereby enabling it to calculate three-dimensional information. It is possible to calculate a distance of an imaged object in the respective pixels in the image through use of parallax. The parallax is obtained by searching where a small area in the standard image is present in the other image and by calculating a difference of coordinates on the image. In the case where the geometric transform is dominant in the horizontal direction and the strong edge is present in the horizontal direction, the three-dimensional information obtained by this processing is used to determine whether the aforementioned pixels are present at positions higher than that of the plane or present at positions lower than that of the plane. This makes it possible to improve the accuracy of discriminating the planar area from the non-planar area. The accuracy of discriminating the planar area from the non-planar area may be improved through use of other feature quantities. It is only necessary for this feature quantity to be input and used in the matching determining section 50 in, for example, FIG. 2, FIG. 7, and FIG. 9.

When the distortion feature quantity calculating section 40 uses the transform parameters of the affine transform, the threshold processing is applied to the evaluation value of Equation (13) calculated using the transform parameters, which have been obtained from the geometric transform image and the standard image, and the transform parameters in the case of no distortion, thereby discriminating the planar area from the non-planar area.

Before applying the threshold processing, in order to perform the evaluation in comprehensive consideration of the local distribution, the area smoothing filter such as the mean filter or the median filter may be applied. Additionally, a result of repeated application of these filters may be used as the value to be differentiated. It is effective for the case where part of the evaluation value cannot be adequately calculated due to a noise and the like, and takes a locally erroneous value. After applying the threshold processing, through use of the morphological operation, the planar area may be reshaped, or the minimal area may be removed. Using the square measure of the connected area etc., the area may be reshaped.

The planar area in the image obtained by the matching determining section 50 is input in the planar area aligning section 20 again as the region of interest, and the geometric transform function calculating section 32 is used to calculate the plane equation. Given that the geometric transform function is Equation (6), taking the geometric relationships between the cameras as those that are well known, the geometric transform function, which minimizes the error function of Equation (1) or Equation (7), is derived, thereby enabling it to calculate the plane equation. Since the whole of the plane obtained by the planar area detecting section is taken as the region of interest, it is possible to obtain the plane equation that approximates the whole of the plane.

DESCRIPTION OF SYMBOLS

10 Left image obtaining section
11 Right image obtaining section
12 Left camera
13 Right camera
20 Image generating section
30 Planar area aligning section
31 Region of interest setting section
32 Geometric transform function calculating section
40 Distortion feature quantity calculating section
41 Gradient direction calculating section
42 Affine parameter calculating section
50 Matching determining section
55 Planar area detecting section

What is claimed is:

1. A detection device of a planar area comprising:
a planar area aligning section configured to set given areas to a plurality of obtained images, and through use of a geometric transform function that matches the area of one image of the plurality of images with the area of the other image of the plurality of images, generate a geometric transform image; and
a planar area detecting section configured to detect a planar area based on the geometric transform image and the area of the other image, wherein:
the planar area aligning section sets a planar area detected by the planar area detecting section as the given area;
the planar area detecting section comprises:
a distortion feature quantity calculating section configured to detect a distortion feature quantity from the geometric transform image;
a matching determining section configured to, based on a distortion feature quantity detected by the distortion feature quantity calculating section, detect a planar area that is a matching area of an area of the geometric transform image and an area of the other image; and
the distortion feature quantity calculating section comprises a gradient direction calculating section configured to, with respect to the respective areas of the geometric transform image and the other image, detect a gradient direction determined based on a ratio of an amount of increase in luminance in a horizontal direction and an amount of increase in luminance in a vertical direction, and take the detected gradient direction as a distortion feature quantity.

2. The detection device of a planar area according to claim 1, further comprising:
   a plurality of image obtaining section configured to obtain a plurality of images; and
   an image generating section configured to, with respect to the obtained plurality of images, correct predetermined distortion, and generate a correction image that has been corrected, wherein
   in the planar area aligning section, a plurality of correction images generated by the image generating section are input.

3. The detection device of a planar area according to claim 1, wherein
   the plurality of images are a left image and a right image.

4. The detection device of a planar area according to claim 1, wherein
   the matching determining section takes areas, in which a distortion feature quantity detected by the geometric transform image is present, as non-matching areas, and takes an area other than the non-matching areas as a planar area.

5. The detection device of a planar area according to claim 1, wherein the planar area aligning section comprises:
   an area setting section configured to, with respect to a plurality of obtained images, set as the given area an area highly likely to include a planar area or the planar area detected by the planar area detecting section; and
   a geometric transform function calculating section configured to, through use of the geometric transform function, perform geometric transform to an area of one image of the plurality of images, which has been set by the area setting section, to generate a geometric transform image.

6. The detection device of a planar area according to claim 1, wherein
   the planar area aligning section calculates the geometric transform function that matches a plurality of given areas of the plurality of images.

7. A stereo camera system comprising:
   a stereo camera configured to take a left image and a right image;
   an image obtaining section configured to obtain a left image and a right image from the stereo camera;
   a planar area aligning section configured to set given areas to the obtained left image and right image, and through use of a geometric transform function that matches the area of one of the left image or the right image with the area of the other, perform geometric transform to generate a geometric transform image; and
   a planar area detecting section configured to detect a planar area based on the geometric transform image and the one or the other area where the geometric transform is not performed, wherein:
   the planar area aligning section sets a planar area detected by the planar area detecting section as the given area;
   the planar area detecting section comprises:
      a distortion feature quantity calculating section configured to detect a distortion feature quantity from the geometric transform image; and
      a matching determining section configured to, based on a distortion feature quantity detected by the distortion feature quantity calculating section, detect a planar area that is a matching area of the geometric transform image and the one or the other area where geometric transform is not performed; and
   the distortion feature quantity calculating section comprises a gradient direction calculating section configured to, with respect to each of the geometric transform image and the one or the other area where the geometric transform is not performed, detect a gradient direction determined based on a ratio of an amount of increase in luminance in a horizontal direction and an amount of increase in luminance in a vertical direction, and take the detected gradient direction as a distortion feature quantity.

8. The stereo camera system according to claim 7, wherein the planar area aligning section comprises:
   an area setting section configured to set, as the given areas, areas highly likely to include a planar area or the planar area detected by the planar area detecting section with respect to the obtained left image and right image; and
   a geometric transform function calculating section configured to, through use of the geometric transform function, perform geometric transform to an area of one image of the left image and the right image set by the area setting section to generate a geometric transform image.

* * * * *